United States Patent [19]
Stephany et al.

[11] Patent Number: 5,771,063
[45] Date of Patent: Jun. 23, 1998

[54] METHOD AND APPARATUS FOR POSITIONING A POLYGON ON A SPINDLE OF A LASER WRITER

[75] Inventors: Thomas M. Stephany, Churchville; Edward P. Furlani, Lancaster, both of N.Y.

[73] Assignee: Eastman Kodak Company, Rochester, N.Y.

[21] Appl. No.: 906,885

[22] Filed: Aug. 6, 1997

Related U.S. Application Data

[63] Continuation of Ser. No. 428,461, Apr. 25, 1995, abandoned.
[51] Int. Cl.[6] .............................. B41J 2/47; G02B 26/08
[52] U.S. Cl. ........................................ 347/260; 359/200
[58] Field of Search ...................................... 347/257, 261, 347/260, 259, 245, 243; 359/198, 200, 216–219; 250/491.1, 234–236

[56] References Cited

U.S. PATENT DOCUMENTS 5,598,291   1/1997   Isobe et al. ........................... 359/198

FOREIGN PATENT DOCUMENTS 59-197009   11/1984   Japan ................................... 359/200
63-273817   11/1988   Japan ................................... 359/198
   264521    3/1990   Japan ................................... 359/200

Primary Examiner—Benjamin R. Fuller
Assistant Examiner—Charlene Dickens
Attorney, Agent, or Firm—Peyton C. Watkins

[57] ABSTRACT

An apparatus for positioning a laser deflector in a laser writer, the apparatus comprises a rotatable spindle assembly for receiving the laser deflector. A frame encloses a portion of said spindle assembly, and two adjustable members are integrally attached to the frame, and the members include a tapered end which contacts the laser deflector for moving the laser deflector which, in turn, positions the laser deflector on said spindle assembly.

7 Claims, 3 Drawing Sheets

METHOD AND APPARATUS FOR POSITIONING A POLYGON ON A SPINDLE OF A LASER WRITER

This is a continuation of application Ser. No. 008/428,461, filed 25 Apr. 1995 now abandoned.

CROSS-REFERENCE TO RELATED APPLICATIONS

The present application is related to U.S. application Ser. No. 08/391,796, filed Feb. 21, 1995 by Thomas M. Stephany and William Mey and entitled "A METHOD FOR CREATING A MULTI-FACETED POLYGON FOR A LASER WRITER"; and U.S. application entitled "A FIELD REPLACEABLE SPINDLE ASSEMBLY FOR A LASER WRITER" filed Mar. 23, 1995 by Thomas M. Stephany, William Mey, W. Schmidtmann and T. Lodadio.

FIELD OF THE INVENTION

The invention relates generally to the field of laser writers and, more particularly, relates to an apparatus and method for positioning a polygon on a spindle assembly of a laser writer.

BACKGROUND OF THE INVENTION

In laser printing devices, such as laser printers, copiers and other similar devices, a laser beam is directed onto a multi-faceted polygon having a plurality of reflecting surfaces for permitting each surface to reflect the laser beam onto a recording medium, such as film or photographic paper. A circular hole is provided through the center of the polygon for receiving a shaft of a spindle assembly which rotates the polygon at a constant predetermined velocity. As the polygon is rotated within the printing device, each surface of the polygon successively writes one complete line on the recording medium.

Ideally, each surface of the polygon writes onto the recording medium with a constant exposure level to eliminate creating artifacts on the recording medium due to having various exposure levels for each line. To provide this constant exposure level, the intensity of the beam and the time it takes for each reflecting surface to write a complete line should remain constant throughout the entire writing process. The beam intensity is, without much difficulty, maintained at a constant rate by techniques which are well known in the art; however, if one wishes to replace the polygon and maintain a constant reflection or writing time for each reflecting surface, the task is time consuming, difficult, labor intensive and expensive, as is described in detail below.

A solution for replacing the polygon is discussed in co-pending and commonly owned U.S. patent application Ser. No. 08/391,796, which is hereby incorporated by reference. This application discloses a polygon which includes a lip portion for indicating when the polygon is centered on the spindle assembly. As the polygon is rotated on the spindle assembly, a runout indicator is placed against the lip portion, and when the indicator indicates zero runout, the polygon is correctly centered on the spindle assembly. However, the polygon is frequently shifted on the spindle to get the polygon in the correct position so that the indicator indicates zero runout. Due to the unique characteristics of the polygon, the reflecting surfaces of the polygon may not be touched during this shifting process. Time consuming manual procedures such as tramming (i.e., tapping with a soft non-marring object) are used for shifting the polygon on the spindle assembly.

Although the presently known and utilized device for shifting the polygon is satisfactory, it is not without drawbacks. As previously stated, tramming procedures are time consuming, difficult and labor intensive.

Consequently, a need exists for a positioning apparatus and method for positioning the rotational center of the polygon being installed to the rotational center of the spindle.

SUMMARY OF THE INVENTION

The present invention is directed to overcoming one or more of the problems set forth above. Briefly summarized, according to one aspect of the present invention, the invention resides in an apparatus for positioning a laser deflector in a laser writer, the apparatus comprising: (a) a rotatable spindle assembly for receiving the laser deflector; (b) a frame for enclosing a portion of said spindle assembly; and (c) two adjustable members integrally attached to said frame, and said members both include a tapered end which contacts the laser deflector for moving the laser deflector which, in turn, positions the laser deflector on said spindle assembly.

It is an object of the present invention to assist in the alignment of a field replaceable spindle assembly.

It is another object of the present invention to provide means with which to align a polygon upon a spindle assembly which is not field replaceable.

It is a further object of the present invention to also provide alignment means for any polygon which must be mounted and aligned to the rotational center of any shaft.

It is an advantage of the present invention to provide a means with which to position a polygon upon a spindle without touching the scanning surfaces by an efficient and easily utilized method.

It is a feature of the present invention to provide two adjustable members integrally attached to a frame, and the members both include a tapered end which contacts the laser deflector for moving the laser deflector which, in turn, positions the laser deflector on the spindle assembly.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
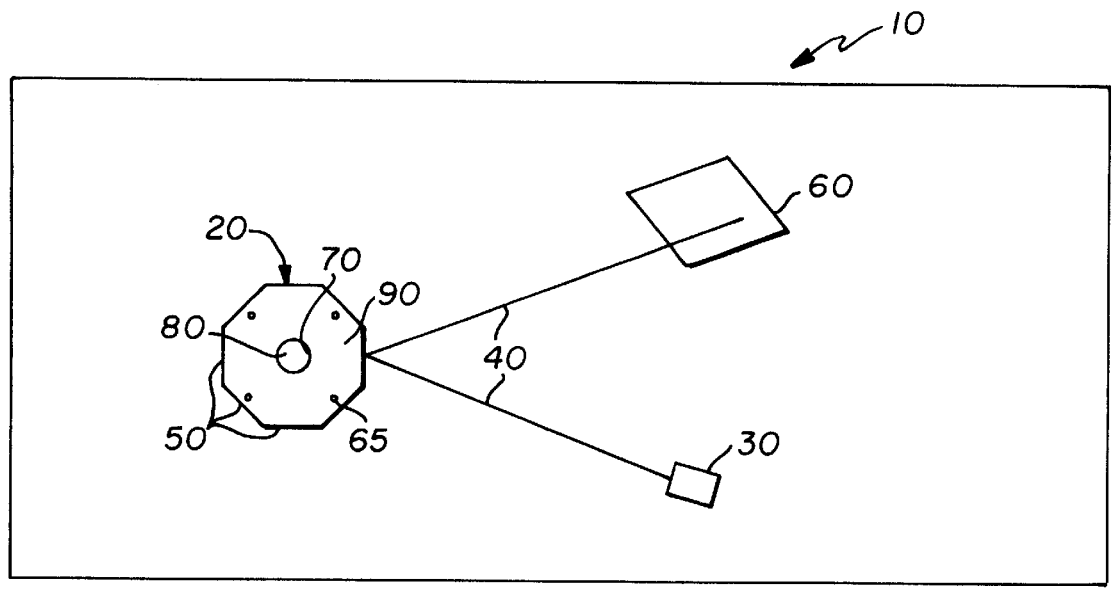
FIG. 1 is a schematic diagram of a typical laser writer for illustrating the environment of the present invention.

Referring to FIG. 1, there is shown a schematic diagram of a typical laser printer 10, which includes a polygon 20 of the present invention, for illustrating the environment of the polygon 20 of the present invention, although the polygon 20 may be implemented on any laser writing device. A laser beam source 30 directs a laser beam 40 on the polygon 20, and the beam 40 is reflected by one of a plurality of reflecting surfaces 50 onto a recording medium 60, such as paper in this embodiment. Although eight reflecting surfaces 50 are shown in the preferred embodiment, the polygon 20 may have any number of reflecting surfaces 50. The polygon 20 is mounted to a spindle assembly 80 via a plurality of mounting screws 65 positioned respectively through the polygon 20. A center hole 70 of the polygon 20 receives the spindle assembly 80 for rotating the polygon 20 via a motor (not shown) which, in turn, permits each reflecting surface 50 to successively write an entire line onto the paper.

Figure 2:
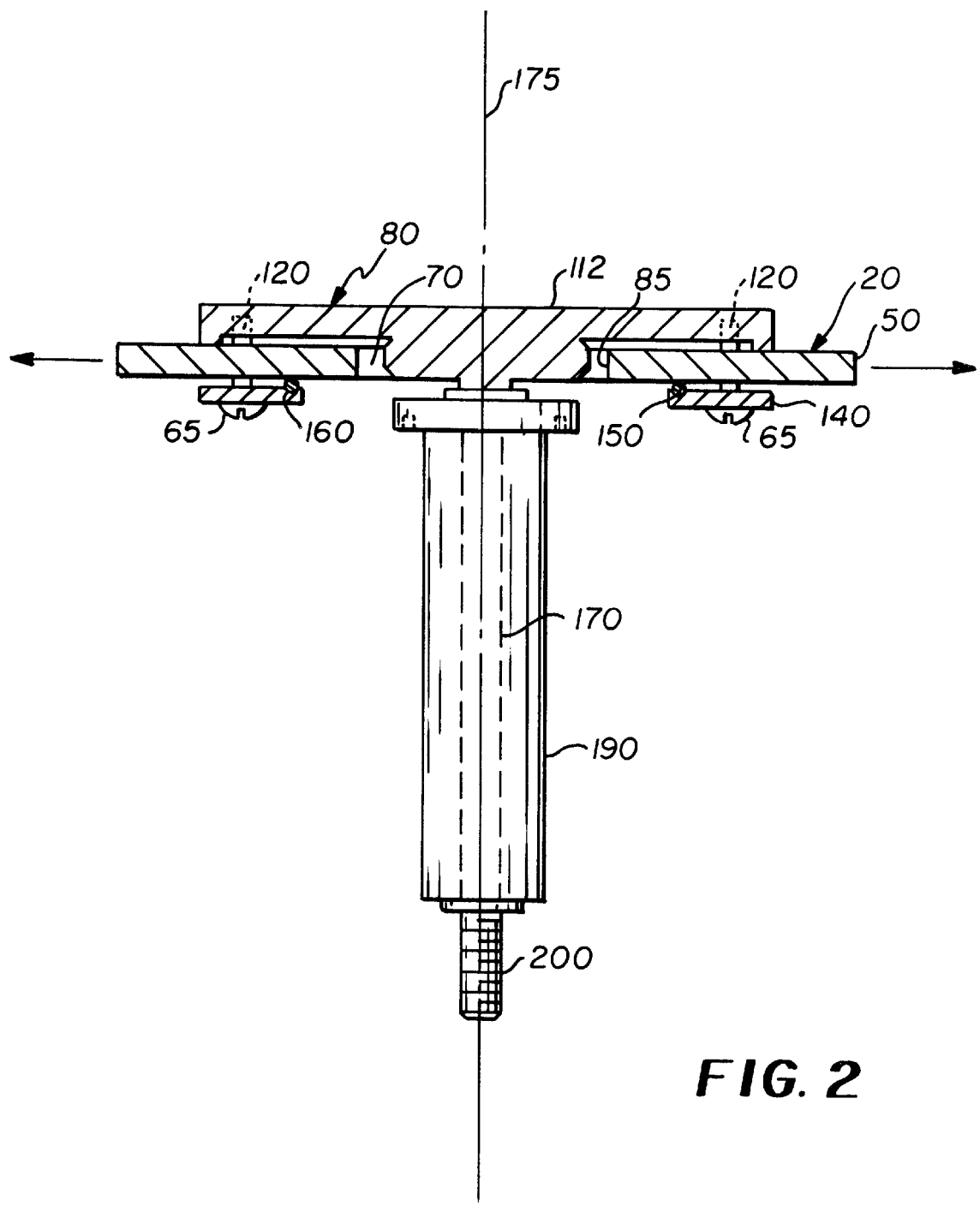
FIG. 2 is a side view in cross-section of a laser writer polygon attached to a spindle assembly.

Referring to FIG. 2, there is illustrated the polygon 20 having an inner surface 85 defining the center hole 70 therethrough. The spindle assembly 80 includes a spindle head 112 having a plurality of holes 120 which extend partially into and around the periphery of the spindle head 112 for respectively receiving a plurality of screws 65. A mounting cap 140, which includes an O-ring 150 resting in a groove 160 of the cap 140, is placed adjacent to the polygon 20 and also receives the screw 65 for permitting the polygon 20 to be attached to the spindle head 112 when the screws 65 are tightened. The O-ring 150 functions to distribute the load from the tightened screws 65. A rotatable spindle shaft 170, having a center 175, is attached to the spindle head 112 and is enclosed by a housing 190 which protectively surrounds the shaft 170. The shaft includes a threaded end portion 200 for receiving a portion of a positioning device 210 (not shown in FIG. 2) which is described in detail below.

Figure 3:
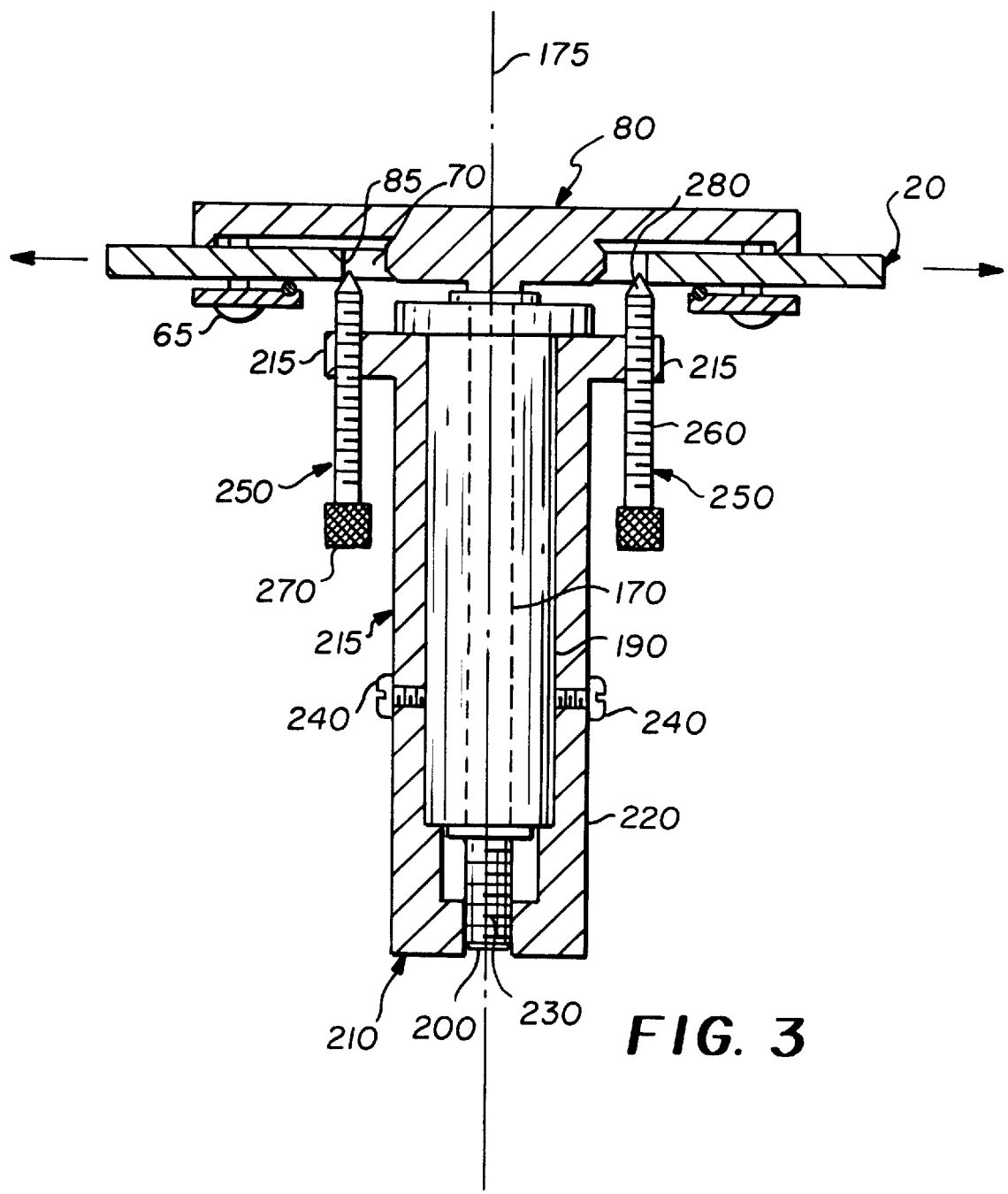
FIG. 3 is a side view of a positioning device of the present invention attached to the spindle assembly.

Referring to FIG. 3, there is illustrated the positioning device 210 attached to the spindle assembly 80. The positioning device 210 includes a frame 214 having a body 220 with threads 230 in a portion of its interior which allows attachment to the threaded end portion 200 of the spindle shaft 170. A circular-shaped lip portion of frame 214 is integrally attached to and extends radially outward from the body 220. The body 220 of the positioning device 210 matingly fits surrounding the spindle the housing 190, and the body 220 is secured to bearing housing 190 via a plurality of screws 240, which are threaded into the body 220 and against the housing 190.

A plurality of adjustment screws 250 include a threaded shaft 260 having a knurled head 270 at one end and a tapered tip 280 at its other end. The screws 250 are manually rotated, by turning the knurled head 270, for threading them into the lip portion 215 of the positioning device 210. A straight-shaped or oblique-shaped tapered tip 280 of the screws 250 contacts the center hole 70 of the polygon 20 for causing the polygon 20 to move perpendicular relative to the adjustment screws 250 (as indicated by the arrows).

Figure 4:
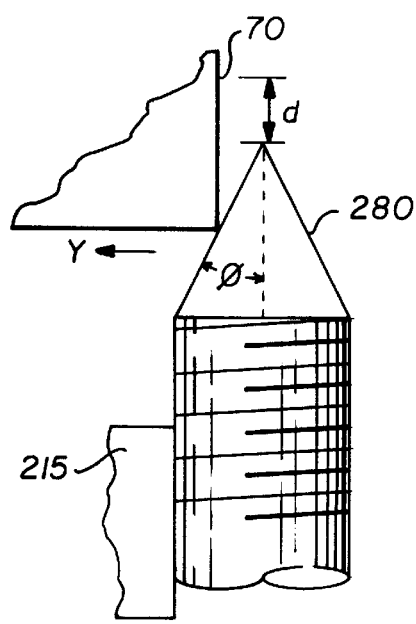
FIG. 4 is a detailed view of an adjustment screw of the positioning device.

Referring now to FIGS. 3 and 4, the operation of the positioning device 210 will be illustrated. Each screw 250 may be either threaded into or out of the lip portion 215 either simultaneously or individually for adjusting the polygon 20 for purposes of aligning the center of the shaft 170 with the center of polygon 20. This alignment is performed without touching the surfaces 50 so that the physical characteristics of the surfaces 50 are not damaged. When the screws 250 are threaded into the lip portion 215, the displacement (y) imparted to the polygon 20 by the tapered tip 280 of adjustment screw 250 is calculated by the formula $y = d \sin \theta$ (where d equals the displacement controlled by turning adjustment screws 250). When the polygon 20 is correctly positioned on the spindle shaft 170 (the two centers are aligned), the screws 65 are tightened for rigidly attaching the polygon 20 and spindle head 112 together.

The invention has been described with reference to a preferred embodiment. However, it will be appreciated that variations and modifications can be effected by a person of ordinary skill in the art without departing from the scope of the invention.

Parts List:

10 laser printer
20 polygon
30 laser beam source
40 laser beam
50 reflecting surface
60 recording medium
65 mounting screws
70 center hole
80 spindle assembly
85 inner surface
112 spindle head
120 holes
140 mounting cap
150 O-ring
160 groove
170 spindle shaft
175 center
190 housing
200 end portion
210 positioning device
215 frame
220 body
230 threads
240 screws
250 adjustment screw
260 threaded shaft
270 knurled head
280 tapered tip

We claim:

1. A laser writer having a laser deflector, which includes a recessed portion therein, the laser writer comprising:

(a) a rotatable spindle assembly, that receives the laser deflector and said spindle assembly includes a center;

(b) a frame that encloses a portion of said spindle assembly; and (c) two adjustable members integrally attached to said frame, and said members both include a tapered end which extends into the recessed portion which directly moves the laser deflector radially relative to the center of said spindle assembly for positioning the laser deflector independent of touching scanning surfaces of said laser deflector.

2. The laser writer as in claim 1, wherein the tapered end of said screws includes a substantially straight taper.

3. The laser writer as in claim 1, wherein the tapered end of said screws includes a substantially oblique taper.

4. The laser writer as in claim 2, wherein said frame includes a substantially cylindrical body for matingly enclosing a portion of said spindle assembly.

5. The laser writer as in claim 4, wherein said frame includes a lip portion which extends substantially radially from said body for receiving said screws.

6. A method for positioning a laser deflector in a laser writer, the method comprising the steps of:

(a) receiving the laser deflector on a rotatable spindle assembly having a center;

(b) enclosing a portion of the spindle assembly with a frame having a cylindrical body which encloses the enclosed portion of the spindle assembly, and having a lip portion which extends radially from the body; and (c) integrally attaching two adjustable members to the lip portion;

wherein both said members include a tapered end which contacts the laser deflector that moves the laser radially relative to the center of said spindle assembly for positioning the laser deflector independent of touching scanning surfaces of said laser deflector.

7. The method as in claim 6 further comprising rotating the adjustable members for displacing the tapered end which abuts an inner surface of the laser deflector.

* * * * *